Nov. 6, 1923. N. WALKER 1,473,133
HOSE CLAMP
Filed Jan. 2, 1923  2 Sheets-Sheet 1
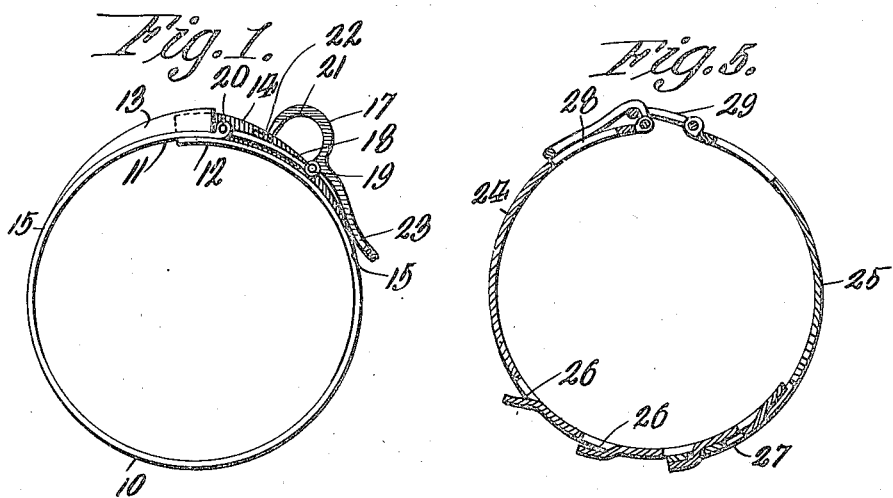
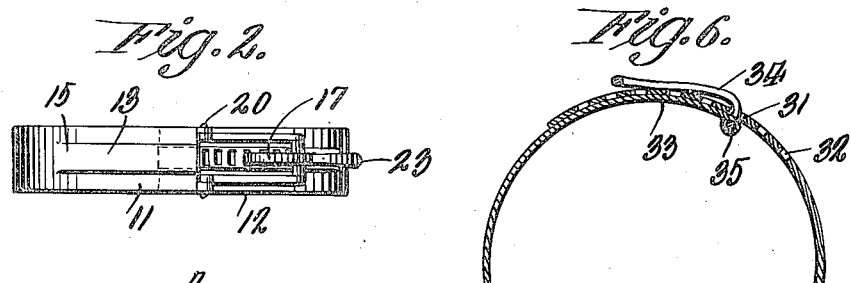
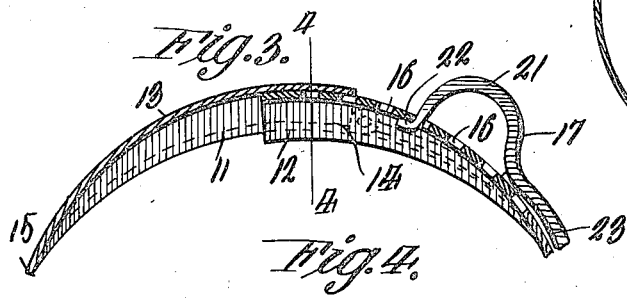
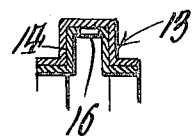
WITNESSES
Guy M Spring
Frank Fraser
Inventor
NEIL WALKER
By Richard B Owen, Attorney

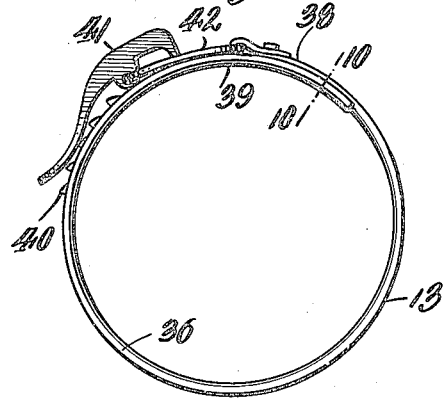
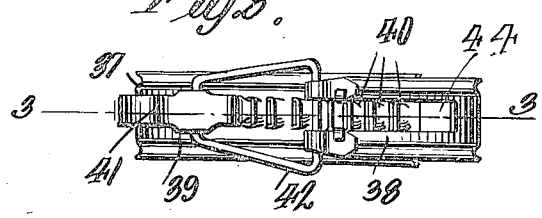
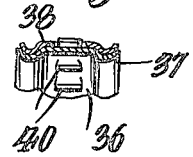
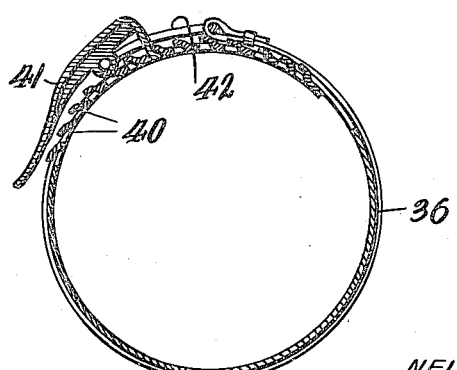

Patented Nov. 6, 1923.

1,473,133

UNITED STATES PATENT OFFICE.

NEIL WALKER, OF MADISON, INDIANA.

HOSE CLAMP.

Application filed January 2, 1923. Serial No. 610,225.

*To all whom it may concern:*

Be it known that I, NEIL WALKER, a citizen of the United States, residing at Madison, in the county of Jefferson and State of Indiana, have invented certain new and useful Improvements in Hose Clamps, of which the following is a specification.

My invention relates to improvements in hose clamps, and has particular reference to a hose clamp that is especially well adapted to be used as an automobile hose clamp.

An object of my invention is to provide a hose clamp, or fastener, that may be clamped or tightened without the use of a bolt or a screw, and which is so constructed, that when it is once clamped or fastened it will be impossible for my improved clamp to work loose.

A further object of my inventtion is to provide a hose clamp, that is strong, durable, very simple and inexpensive in construction, and is especially well adapted to the use for which it is designed.

Other objects and advantages of the invention will become apparent during the course of the following description.

In the drawings, wherein like numerals are employed to designate like parts throughout the same:

Figure 1 is a front elevation illustrating my device when it is in a clamped position, Figure 2 is a top plan view of the same.

Figure 3 is a fragmentary vertical section through my device.

Figure 4 is a section taken substantially on line 4—4 of Figure 3.

Figure 5 is a vertical section taken through a modification of my device,

Figure 6 is a vertical section through a second modification of my invention,

Figure 7 is a front elevation of an improved form of my invention,

Fig. 8 is a top plan view of the same, and

Figure 9 is a section taken on line 9—9 of Figure 8.

Figure 10 is a section taken on line 10—10 of Figure 7.

In the drawings, wherein for the purpose of illustration are shown the preferred embodiments of my invention, the numeral 10 designates a band of non-corrosive metal which is bent or pressed into shape, so that the ends 11 will overlap the ends 12. The ends 11 and 12 are pressed to form the raised ribs 13 and 14 respectively, the raised portion 13 being large enough to accommodate the reception of the raised portion 14 of the end 12. The raised portions 13 and 14 gradually converge toward the body of the band, to a point 15.

The raised rib 14 is provided with a plurality of spaced locks or elongated apertures 16, and are formed in the rib 14 beginning at a point near its outer end to the point 15. A cam lever 17 is pivotally connected to the end 11, by means of a link 18, which carries a hinged connection to the cam lever 17 at 19, said link 18 having a hinged connection to the end 11 of the band 10, by means of the bosses 20. The cam lever 17 is hinged at 19 intermediate its ends and is provided at its forward end with a curved portion 21, which terminates in the angular extension 22, which is adapted to be received in one of the apertures 16 of the raised rib 14. The opposite end of the cam lever 17 is formed into an operating lever 23, whereby the device may be thrown into and out of an operative position when it is so desired.

It will thus be seen, that in use, the clamp may be made in any suitable size, and adjustable to different sized hose clamps, to be used for automobiles, and the clamp is applied by separating the ends 11 and 12, sufficiently to allow the clamp or band 10 to be slipped around the hose member and the end 11 which is provided with the raised rib 13 is adapted to overlie the end 12 so that the raised rib portion 14 of the end 12 will be seated in the concave point of the rib 13. The angular extension 22 of the cam lever 17 is stretched to reach one of the apertures 16, and the operating lever 23 is depressed and the clamp will be securely held in place. It will readily be seen that the cam lever 17 is so constructed that when the operating lever 23 is depressed it will be impossible for the ends 11 and 12 to become disengaged.

In Figure 5 of the drawings, is shown a slight modification of the invention, and comprises the sections 24 and 25. The section 24 is provided with the ears 26, which are formed integral therewith, and are adapted to be received within the opening 27 formed in the other section 25. It will thus be seen, that an adjustment may be had by reason of the ears 26 and the openings 27. A cam link 28 which is carried by the section 24 is adapted to engage a pivoted link 29 which is carried by the section 25.

A slight abbreviation from this construction is illustrated in Figure 6 of the drawings, and comprises a body formed of a band of material. The body 30 is bent or pressed into shape so that the ends 31, which are provided with a plurality of apertures 32 will overlie the ends 33. A link or cam lever 34 is pivotally connected to the end 33 by means of the connection 35. It will thus be seen that the cam link 34 is adapted to engage or be received in any of the apertures 32, thereby allowing minute adjustment.

In Figure 7 of the drawings, the numeral 36 designates the body of one form of my invention and is formed from a single strip of material, which is rolled up at its edges to form the flanges 37. The end 38 is adapted to overlie the end 39, as clearly illustrated in the drawing. The end 38, is provided with the notches 40, which are formed by pressing the material, or in any other way, said notches 40 as clearly illustrated in Figure 9 of the drawings, being formed relatively close to each other, so that minute variations may be had when the clamp is in use. A lever 41 is pivotally connected to a link 42, which is hingedly mounted on the ends 38, as at 43.

In order to allow the device to operate, the body 36 is beaded along its edges, and likewise the elongated slot 44 is formed between the flanges and the end 38, to allow the notches 40 to be passed around under the end 38. When the device is in operation, as shown in Figure 9, due to the fact that the lever 41 is a cam lever, when the handle is depressed it will be impossible for the device to become disengaged until the handle is manually lifted upwardly, whereby the device may be released.

It is to be understood that the forms of my invention herewith shown and described are to be taken as a preferred embodiment of the same, and that various changes in the shape, size and arrangement of parts may be resorted to, without departing from the spirit of my invention or the scope of the subjoined claims.

Having thus described my invention, I claim:

1. A hose clamp of the class described comprising a body portion, raised rib portions formed near the ends of said body portion, said raised portions gradually converging toward the body portion, one of said raised rib portions being adapted to receive the other raised rib portion, a link carried by one end of said body portion, a cam lever connected to said link, said cam lever being adapted to be received within apertures formed in the other end of said body portion.

2. A hose clamp of the class described comprising a body portion formed from a band of material, rib portions formed near the end thereof being substantially U-shaped in cross section, one of said rib portions being adapted to be received within the concave side of the other rib portion, and means carried by one end of said body portion to hold said end in a clamped position.

3. A hose clamp of the class described comprising a body portion formed from a band of material, the ends thereof being provided with raised rib portions, substantially U-shaped in cross section, one of said ends being adapted to overlie the other end, and a cam lever carried by one end and adapted to be received within apertures formed in the other end thereof.

4. A hose clamp of the class described comprising a body formed from a strip of material, rib portions formed near the end thereof being substantially U-shaped in cross section, one of said rib portions being adapted to receive the other rib portion, a cam lever pivotally carried by one end of said body portion, said cam lever being adapted to be received within apertures formed in the other end of said body portion.

In testimony whereof I affix my signature in presence of two witnesses.

NEIL WALKER.

Witnesses.
   D. H. WEYER,
   B. A. GEILE.